United States Patent
Qin et al.

(10) Patent No.: US 11,036,839 B2
(45) Date of Patent: Jun. 15, 2021

(54) PASSWORD AUTHENTICATION WITH INPUT PATTERN ANALYSIS

(71) Applicant: Beijing DiDi Infinity Technology and Development Co., Ltd., Beijing (CN)

(72) Inventors: Xuewen Qin, San Jose, CA (US); Liwei Ren, San Jose, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 122 days.

(21) Appl. No.: 16/220,206

(22) Filed: Dec. 14, 2018

(65) Prior Publication Data

US 2020/0193001 A1 Jun. 18, 2020

(51) Int. Cl.
*G06F 21/31* (2013.01)
*G06F 21/40* (2013.01)
*G06F 3/0482* (2013.01)

(52) U.S. Cl.
CPC .......... *G06F 21/316* (2013.01); *G06F 3/0482* (2013.01); *G06F 21/40* (2013.01)

(58) Field of Classification Search
CPC ...... G06F 21/316; G06F 3/0482; G06F 21/40; G06F 21/602; G06F 3/0488
See application file for complete search history.

(56) References Cited

U.S. PATENT DOCUMENTS 6,895,514 B1 * 5/2005 Kermani ............... G06F 21/316 726/19
10,122,706 B2 * 11/2018 Greenspan .......... H04L 63/0861
2016/0021090 A1   1/2016 Qian
2018/0075225 A1   3/2018 Lai et al.
2018/0097794 A1 * 4/2018 Brown ................. H04L 63/083

FOREIGN PATENT DOCUMENTS

| CN | 103455752 A | 12/2013 |
| CN | 104063643 A | 9/2014 |
| CN | 104283679 A | 1/2015 |
| CN | 104580091 A | 4/2015 |
| CN | 105099998 A | 11/2015 |
| CN | 105488365 A | 4/2016 |
| CN | 107944871 A | 4/2018 |
| EP | 1469372 A2 | 10/2004 |

OTHER PUBLICATIONS

"Machine Learning Methods in Authentication Problems Using Password Keystroke Dynamics"—Kaganov et al, Computational Mathematics and Modeling, May 28, 2015 https://link.springer.com/article/10.1007/s10598-015-9280-3 (Year: 2015).*

* cited by examiner

*Primary Examiner* — Randy A Scott
(74) *Attorney, Agent, or Firm* — Sheppard Mullin Richter & Hampton LLP

(57) ABSTRACT

Password information and password input pattern information for a user may be obtained. The password information may define a password submitted by the user. The password input pattern information may define an input pattern with which the password was inputted by the user. The password may be compared with a predefined password for the user. The input pattern may be compared with a predefined input pattern for the user. The password may be authenticated based on a first match between the password and the predefined password and a second match between the input pattern and the predefined input pattern.

20 Claims, 7 Drawing Sheets

PASSWORD AUTHENTICATION WITH INPUT PATTERN ANALYSIS

TECHNICAL FIELD

The disclosure relates generally to authenticating passwords using input pattern analysis.

BACKGROUND

Use of passwords to authenticate users has many limitations. For example, simple passwords are not secure, but complex passwords are not easy for users to remember. Users may write down complex passwords, exposing the passwords to unauthorized access. Two-factor authentication may increase security of password uses. Two-factor authentication may be provided via communication with the users. For example, when a user enters a password, the user may be prompted to enter an additional code (generated via fobs, texted to the user's phone number) to verify the user's identify. However, users may not be comfortable with such two-factor authentication or may not have equipment available to generate/receive the additional code. Moreover, such two-factor authentication may require separate mechanism to generate the additional code.

SUMMARY

One aspect of the present disclosure is directed to a system for authenticating passwords. The system may comprise one or more processors and a memory storing instructions. The instructions, when executed by the one or more processors, may cause the system to perform: obtaining password information for a user, the password information defining a password submitted by the user; obtaining password input pattern information for the user, the password input pattern information defining an input pattern with which the password was inputted by the user, the input pattern including a character pattern and a timing pattern with which one or more characters of the password was inputted by the user; comparing the password with a predefined password for the user; comparing the input pattern with a predefined input pattern for the user; and authenticating the password based on a first match between the password and the predefined password and a second match between the input pattern and the predefined input pattern.

In some embodiments, the character pattern may be defined by the user's use of one or more edit inputs to define the password, the one or more edit inputs including one or more of a character addition input, a character deletion input, a shift input, a caps-lock input, a change in entry point input, a copy input, and/or a paste input; and the timing pattern may be defined by one or more durations of time between input of individual character of the password.

Another aspect of the present disclosure is directed to a system for authenticating passwords. The system may comprise one or more processors and a memory storing instructions. The instructions, when executed by the one or more processors, may cause the system to perform: obtaining password information for a user, the password information defining a password submitted by the user; obtaining password input pattern information for the user, the password input pattern information defining an input pattern with which the password was inputted by the user; comparing the password with a predefined password for the user; comparing the input pattern with a predefined input pattern for the user; and authenticating the password based on a first match between the password and the predefined password and a second match between the input pattern and the predefined input pattern.

Another aspect of the present disclosure is directed to a method for authenticating passwords. The method may comprise: obtaining password information for a user, the password information defining a password submitted by the user; obtaining password input pattern information for the user, the password input pattern information defining an input pattern with which the password was inputted by the user; comparing the password with a predefined password for the user; comparing the input pattern with a predefined input pattern for the user; and authenticating the password based on a first match between the password and the predefined password and a second match between the input pattern and the predefined input pattern.

In some embodiments, the input pattern may include a character pattern with which one or more characters of the password was inputted by the user. The character pattern may be defined by the user's use of one or more edit inputs to define the password. The one or more edit inputs may include one or more of a character addition input, a character deletion input, a shift input, a caps-lock input, a change in entry point input, a copy input, and/or a paste input. The user's use of the one or more edit inputs may be determined based on the user' interaction with one or more of a keyboard, a mouse, and/or a touchscreen display.

In some embodiments, the input pattern may include a timing pattern with which one or more characters of the password was inputted by the user. The timing pattern may be defined by one or more durations of time between input of individual character of the password.

In some embodiments, the predefined input pattern for the user may be associated with a platform with which the password was inputted by the user.

In some embodiments, the predefined input pattern for the user may not be associated with a platform with which the password was inputted by the user.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which.

DETAILED DESCRIPTION OF THE EMBODIMENTS

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

The approaches disclosed herein improve security of using passwords for user authentication. The approaches disclosed herein uses a combination of a password (e.g., static information) with input pattern (e.g., user behavior pattern for inputting the password) to authenticate the user. By using a password as a first factor in authentication and an input pattern with which the password was inputted by a user as a second factor in authentication, a two-factor password authentication with input pattern analysis is provided. The approaches disclosed herein provides for more secure authentication of users without having to communicate additional code (generated via fobs, texted to the user's phone number) to verify the user's identity. Given that users must input their passwords for authentication, no additional steps (e.g., checking fob or mobile device to obtain a second code, entering the second code) are required from the users for authentication.

Figure 1:
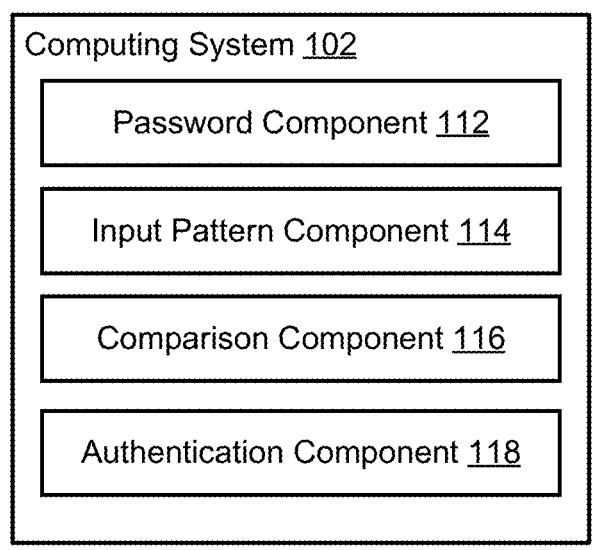
FIG. 1 illustrates an example environment for authenticating passwords, in accordance with various embodiments of the disclosure.

FIG. 1 illustrates an example environment 100 for authenticating passwords, in accordance with various embodiments. The example environment 100 may include a computing system 102. The computing system 102 may include one or more processors and memory (e.g., permanent memory, temporary memory). The processor(s) may be configured to perform various operations by interpreting machine-readable instructions stored in the memory. The computing system 102 may include other computing resources. The computing system 102 may have access (e.g., via one or more connections, via one or more networks) to other computing resources.

The computing system 102 may include a password component 112, an input pattern component 114, a comparison component 116, and an authentication component 118. The computing system 102 may include other components. While the computing system 102 is shown in FIG. 1 as a single entity, this is merely for ease of reference and is not meant to be limiting. One or more components or one or more functionalities of the computing system 102 described herein may be implemented in software. One or more components or one or more functionalities of the computing system 102 described herein may be implemented in hardware. One or more components or one or more functionalities of the computing system 102 described herein may be implemented in a single computing device or multiple computing devices. In some embodiments, one or more components or one or more functionalities of the computing system 102 described herein may be implemented in one or more networks (e.g., enterprise networks), one or more endpoints, one or more servers, or one or more clouds.

The password component 112 may be configured to obtain password information for a user. Password information may refer to information that conveys or represents a password. Password information may define a password submitted by a user. A password may refer to a sequence of characters that allows access to a password protected system, such as a computer, an interface, a program, a service, or other systems. A character may refer to a symbol having one or more meanings, such as a symbol forming part of a word, depicting a letter, depicting a numeral, expressing grammatical punctuation, representing mathematical concepts, or representing other information. For example, a password may include a sequence of letters, a sequence of numbers, a sequence of other symbols, or a sequence of a combination of letters, numbers, or other symbols. A password submitted by a user may refer to a sequence of characters that are submitted for authentication through one or more interfaces by the user.

Submission of a password may be distinguished from input of a password. Input of a password may include a user using one or more input devices (e.g., keyboard, mouse, touchscreen display) to enter one or more characters to form a string of characters. Submission of a password may include an action that provides the string of characters, formed by the input of the password, to one or more systems or one or more components of a system for authentication. For instance, input of a password may include a user using an input device to enter characters that form the phrase "ABC123," and submission of the password may include a user pressing ENTER or clicking on LOGIN button on a user interface to provide the phrase "ABC123" to an authentication server, which may determine whether the phrase "ABC123" matches the password for the user.

Obtaining password information may include one or more of accessing, acquiring, analyzing, determining, examining, identifying, loading, locating, opening, receiving, retrieving, reviewing, storing, or otherwise obtaining the password information. The password component 112 may obtain password information from one or more locations. For example, the password component 112 may obtain password information from a storage location, such as an electronic storage of the computing system 102, an electronic storage of a device accessible via a network, another computing device/system (e.g., desktop, laptop, smartphone, tablet, mobile device), or other locations. The password component 112 may obtain password information from one or more hardware or one or more software. For example, the password component 112 may obtain password information from a login user interface that receives the password submitted by the user or from an input device through which the user inputted the password for submission.

The input pattern component 114 may be configured to obtain password input pattern information for the user. Password input pattern information may refer to information that conveys or represents an input pattern with which a password was inputted by a user. Password input pattern information may define an input pattern with which a password was inputted by a user. An input pattern may refer to a particular way with which a user inputted a password. An input pattern may refer to a particular way with which a user used one or more input devices (e.g., keyboard, mouse, touchscreen display) to enter one or more characters to form a string of characters submitted as a password. That is, an input pattern may be determined based on a user's interaction with one or more input devices. An input pattern may be an inherent pattern in how a password is inputted by a user. For example, referring to the example of the phrase "ABC123," an input pattern may refer to a particular way in which a user used one or more input devices to form the phrase "ABC123."

In some embodiments, an input pattern may include a character pattern. A character pattern may refer to a pattern with which one or more characters of a password was inputted by a user. A character pattern may refer to a pattern of user's interaction with one or more input devices to input the password. A character pattern may be defined by a user's use of one or more edit inputs to define the password. A user's use of one or more edit inputs may be determined based on the user' interaction with one or more input devices. An edit input may refer to an input by a user to change one or more characters that form the string to be submitted as the password. For example, edit inputs may include one or more character addition inputs, one or more character deletion inputs, one or more shift inputs, one or more caps-lock inputs, one or more change in entry point inputs, one or more copy inputs, one or more paste inputs, one or more combinations of the preceding inputs, or other inputs.

A character addition input may refer to an input that adds one or more characters to the string to be submitted as the password. For example, a character addition input may include a strike of a letter key or a number key on a physical keyboard or a virtual keyboard (e.g., interacted by the user using a mouse or a touchscreen display). A character deletion input may an input that removes one or more characters from the string to be submitted as the password. For example, a user may have added characters "A," "B," "C," and "D" via four character addition inputs and may have removed the character "D" via a character deletion input (e.g., strike of a Backspace key or a Delete key on a physical keyboard or a virtual keyboard). In some embodiments, a character addition input and a character deletion input may be combined into a single input. For example, a user may have added characters "A," "B," and "D" via three character addition inputs and may have replaced the character "D" with character "C" by selecting the character "D" and striking a letter key "C."

A shift input may refer to an input that switches between two sets of characters or functions during use of the input, such as between lower and upper case letters. For example, a user may have added a character "A" by using the Shift key in combination with the "A" key on a physical keyboard or a virtual keyboard. A caps-lock-input may refer to an input that toggles between two sets of characters or functions during use of the input, such as between lower and upper case letters. For example, a user may have added characters "A," "B," and "C" by striking the Caps-Lock key and then striking the keys "A," "B," and "C" on a physical keyboard or a virtual keyboard.

A change in entry point input may refer to an input that changes were a subsequently inputted character is placed within the string to be submitted as the password. For example, a user may have added characters "A" and "C," used a Left directional key, a mouse, or a tap on a touchscreen display to position the cursor between "A" and "C," and then added the character "B" between "A" and "C."

A copy input may refer to an input that copies one or more selected characters (e.g., into a virtual clipboard). A paste input may refer to an input that pastes one or more copied characters. For example, a user may have copied the characters "ABC" from a document and may have pasted the characters "ABC" as part of the string to be submitted as the password.

A combination of one or more edit inputs may define an input pattern with which a password is inputted by a user. For example, an input pattern with which a user inputted a string "ABC123" may include typing of characters "A," "B," "C," "1," and "2," followed by typing of another character (e.g., "Z," "4"), followed by deletion of the other character, and followed by typing of character "3." As another example, an input pattern with which a user inputted a string "ABC123" may include typing of characters "A," "B," "C," followed by deletion of the character "C," and followed by typing of characters "C," "1," "2," and "3." As yet another example, an input pattern with which a user inputted a string "ABC123" may include typing of characters "3," "2," "1," "C," "B," "A," followed by deletion of all characters, and followed by typing of characters "A," "B," "C," "1," "2," and "3." Thus, a simple password such as "ABC123" may be tied with a unique input pattern. Multiple users may use the same password and yet have different input patterns with which the user inputs the password.

In some embodiments, the input pattern may include a timing pattern. A timing pattern may refer to a timing with which one or more characters of a password was inputted by a user. A timing pattern may refer to a pattern of user's interaction with one or more input devices to input the password. A timing pattern may be defined by one or more durations of time between input of individual character of the password. For example, a timing pattern for input of a string "ABC123" may include a user typing in quick sequence characters "A," "B," and "C," followed by a wait of ten seconds, and followed by the user typing in quick sequence characters "1," "2," and "3." As another example, a timing pattern for input of a string may include entry of keys of a physical keyboard or a virtual keyboard in synchronization with beats of a song, a tune, or music.

The comparison component 116 may be configured to compare the password submitted by a user with a predefined password for the user and compare the input pattern with which the password was inputted by the user with a predefined input pattern for the user. That is, the comparison component 116 may separately check (1) whether the password submitted by the user matches the predefined password for the user, and (2) whether the input pattern matches the predefined input pattern for the user. A predefined password for a user may refer to a password for the user that is defined, established, or stored before the password component 112 obtains the password information defining the password submitted by the user. The predefined password may be stored within one or more databases or tables, and retrieved (e.g., based on user identifier) for comparison (e.g., using character matching, using hash) with the password submitted by the user. A predefined input pattern for a user may refer to an input pattern for the user that is defined, established, or stored before the input pattern component 114 obtains the password input pattern defining the input pattern with which the password was inputted by the user. The predefined input pattern may be stored within one or more databases or tables, and retrieved (e.g., based on user identifier) for comparison with the password input pattern for the password being authenticated.

In some embodiments, a predefined input pattern for a user may be associated with a platform with which the password was inputted by the user. A platform may refer to one or more technologies through which a password is inputted by a user. A platform may include hardware, software, or a combination of hardware and software. A platform may be associated with one or more version numbers (e.g., version of hardware, version of software). A predefined input pattern being associated with a platform may include the predefined input pattern being used for authentication when a password is inputted using the platform. For example, a user may have different predefined input patterns associated with different platforms for the same password. For instance, a user's input pattern for the password "ABC123" when using a keyboard to input the password may be different from the user's input pattern when using a mouse or a touchscreen display to input the password.

In some embodiments, a predefined input pattern for a user may not be associated with a platform with which the password was inputted by the user. That is, a user may have the same predefined input pattern for inputting a password regardless of the hardware or software used to input the password.

The authentication component 118 may be configured to authenticate the password based on (1) a match between the password and the predefined password, and (2) a match between the input pattern and the predefined input pattern. That is, authentication of a password submitted by a user may require matching of both (1) the characters of the password with a predefined password, and (2) the input pattern with which the password was inputted by the user with a predefined input pattern. Authentication of the password may result in the user being provided with access to password-protected system (e.g., a computer, an interface, a program, a service). Such two-factor authentication of the password may provide additional security for a user's credential for accessing a password-protected system. For example, a user may write down the password on a paper without worrying about an unauthorized user being able to access the password-protected system since the unauthorized user would have to duplicate the user's input pattern. As another example, even if the user's password is exposed (e.g., via network breach), the user's input pattern may still be secure.

In some embodiments, if a user's input pattern does not match the predefined input pattern, the authentication may fail. The user may be prompted to input the password again. In some embodiments, if a user's input pattern does not match the predefined input pattern, the user may be prompted to verify his or her identity (e.g., via security question(s), via transmission of a code to a known phone number or a known email address).

Figure 2:
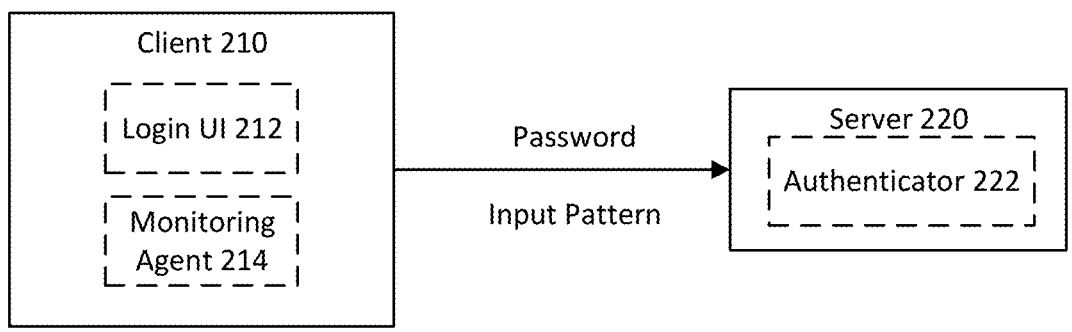
FIG. 2 illustrates an example client-server architecture, in accordance with various embodiments of the disclosure.

FIG. 2 illustrates an example client-server architecture 200, in accordance with various embodiments of the disclosure. The client-server architecture 200 may include a client 210 and a server 220. The client 210 may include a login user interface 212 and a monitoring agent 214. The server 220 may include an authenticator 222. The monitoring agent 214 may be built into or separate from an application that provides the login user interface 212. The monitoring agent 214 may be provided as a plugin.

The login user interface 212 may be provided with a browser or a graphical user interface application. The login user interface 212 may include a password field into which a user may input a string of characters to be submitted as a password. The monitoring agent 214 may monitor the user's behavior in inputting the password. For example, the monitoring agent 214 may monitor the user's interaction with one or more input devices (e.g., keyboard, mouse, touchscreen display) to input the password. For example, the monitoring agent 214 may monitor and record keystrokes from a keyboard, a mouse movement and mouse button clicks, or taps on a touchscreen display. In some embodiments, the monitoring agent 214 may only perform the monitoring and recording function when the cursor is inside the password field.

In some embodiments, the recording of input pattern by the monitoring agent 214 may be associated with characters being inputted by a user. For example, an input pattern with which a user inputted a string "ABC123" may include typing of characters "A," "B," "C," followed by deletion of the character "C," and followed by typing of characters "C," "1," "2," and "3." The recording of the deletion of a character in the input pattern may be associated with the character "C"—that is, the deletion of the character "C" may be recorded by the monitoring agent 214 for provision as part of the input pattern.

In some embodiments, the recording of input pattern by the monitoring agent 214 may not be associated with characters being inputted by a user. The recording of input pattern by the monitoring agent 214 may be independent from characters being inputted by a user. For example, an input pattern with which a user inputted a string "ABC123" may include typing of characters "A," "B," "C," followed by deletion of the character "C," and followed by typing of characters "C," "1," "2," and "3." The recording of the deletion of a character in the input pattern may not be associated with the character "C." For example, the monitoring agent 214 may record the following input pattern: key, key, key, delete, key, key, key, key.

The login user interface 212 may transmit the password submitted by the user to the server 220. The monitoring agent 214 may transmit the input pattern with which the password was inputted by the sure to the server 220. The authenticator 222 of the server 220 may (1) compare the password with a predefined password for the user, (2) compare the input pattern with a predefined input pattern for the user, and (3) authenticating the password based on (1) a match between the password and the predefined password and (2) a match between the input pattern and the predefined input pattern.

Figure 3:
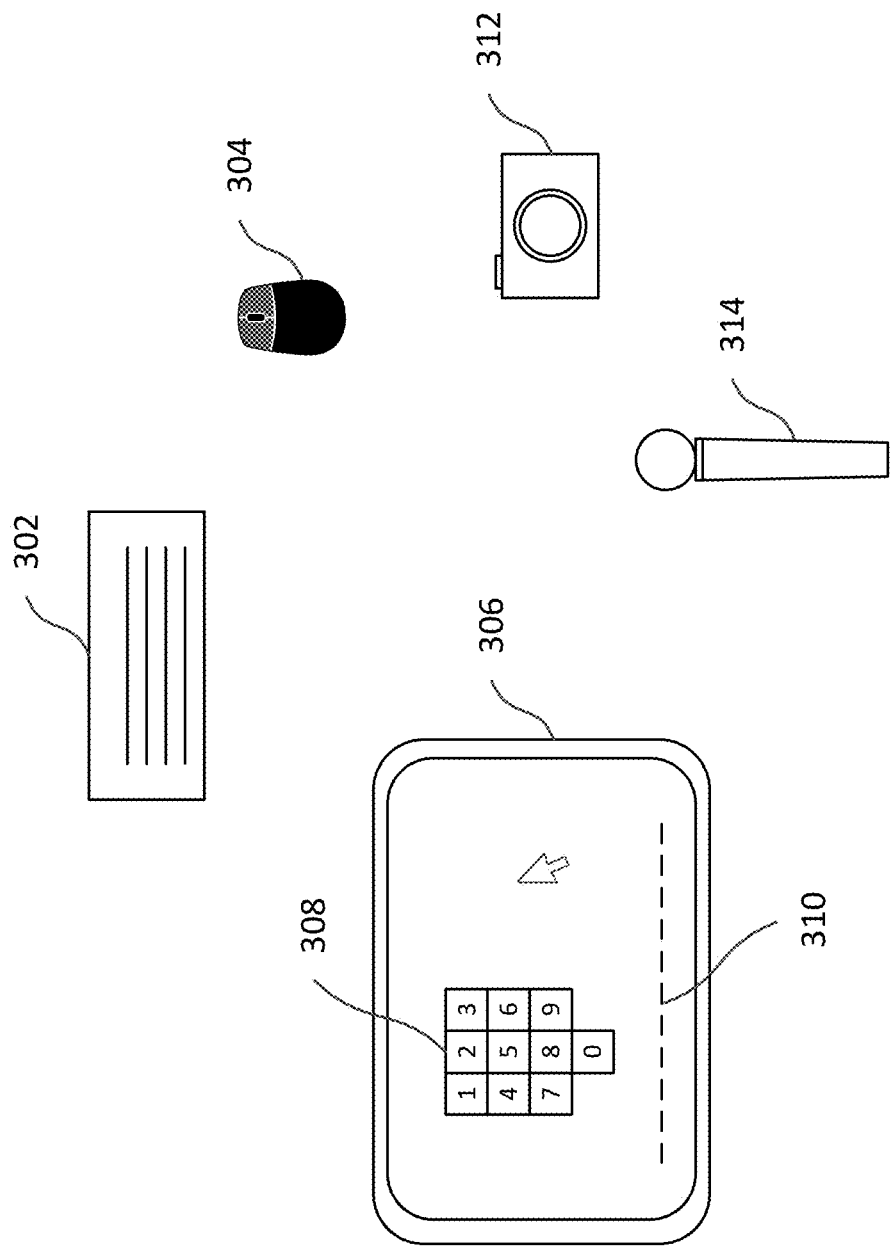
FIG. 3 illustrates examples of input devices, in accordance with various embodiments of the disclosure.

FIG. 3 illustrates examples of input devices, in accordance with various embodiments of the disclosure. Input devices may refer to physical or virtual devices that may be used by a user to input a password. For example, input devices may include one or multiples of a keyboard 302, a mouse 304, a touchscreen display 306 (displaying a virtual number keypad 308 and a password field 310), an image sensor 312 (e.g., camera) which may translate one or more portions of captured images into one or more characters of a password (e.g., a user using the camera to focus on or taking pictures of letters of the password or edits to be made to the password), or a sound sensor 314 (e.g., microphone) which may translate one or more portions of captured sounds into one or more characters of the password (e.g., user using the microphone to speak letters of the password or edits to be made to the password). A user may use one of these example input devices or use a combination of two or more of these input devices. Use of other input device(s) are contemplated.

Figure 4:
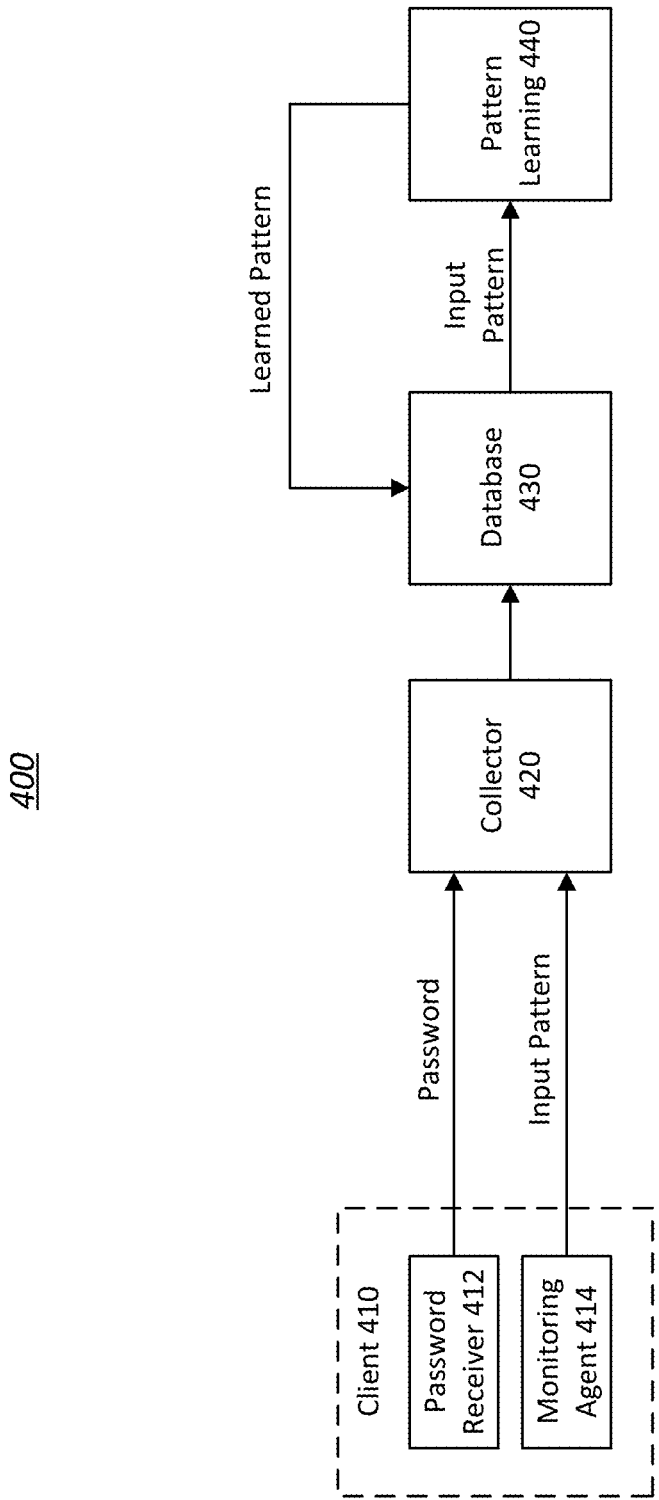
FIG. 4 illustrates an example process of input pattern extraction and learning, in accordance with various embodiments of the disclosure.

FIG. 4 illustrates an example process 400 of input pattern extraction and learning, in accordance with various embodiments of the disclosure. The process 400 may include a client 410 with a password receiver 412 that receives a password from a user and a monitoring agent 414 that records input pattern with which the password was inputted. The password receiver 412 may provide the password to a collector 420, and the monitoring agent 414 may provide the input pattern to the collector 420. The collector 420 may store the password and the input pattern in a database 440. The input pattern may be used for pattern learning 440, which store a learned pattern into the database 430. The learned pattern may be used as a predefined input pattern to compare to subsequent input pattern used by a user.

The pattern learning 440 may include training or machine learning. For example, the pattern learning 440 may observing a user's input pattern for a password for a certain number of times or for a certain duration of time. The observed patterned may be used to generate the learned pattern. In some embodiments, the pattern learning 440 may include request the user to input the password in the same way a certain number of times. The pattern learning 440 may continue until the user inputs the password using an input pattern with sufficient degree of repeatability.

In some embodiments, the pattern learning 440 may be required to be performed before the user is granted access to the password-protected system. For example, on an initial login, the user may be required to interact with the system to generate the learned pattern. The user may be instructed to use or choose an input pattern for inputting the password. In some embodiments, the pattern learning 440 may be performed in the background. For example, the pattern learning 440 may be performed with the user logging into the password-protected system using only the password. When the learned password is generated, the input pattern matching portion of the authentication may be activated to compare the user's input pattern with the learned pattern.

Figure 5:
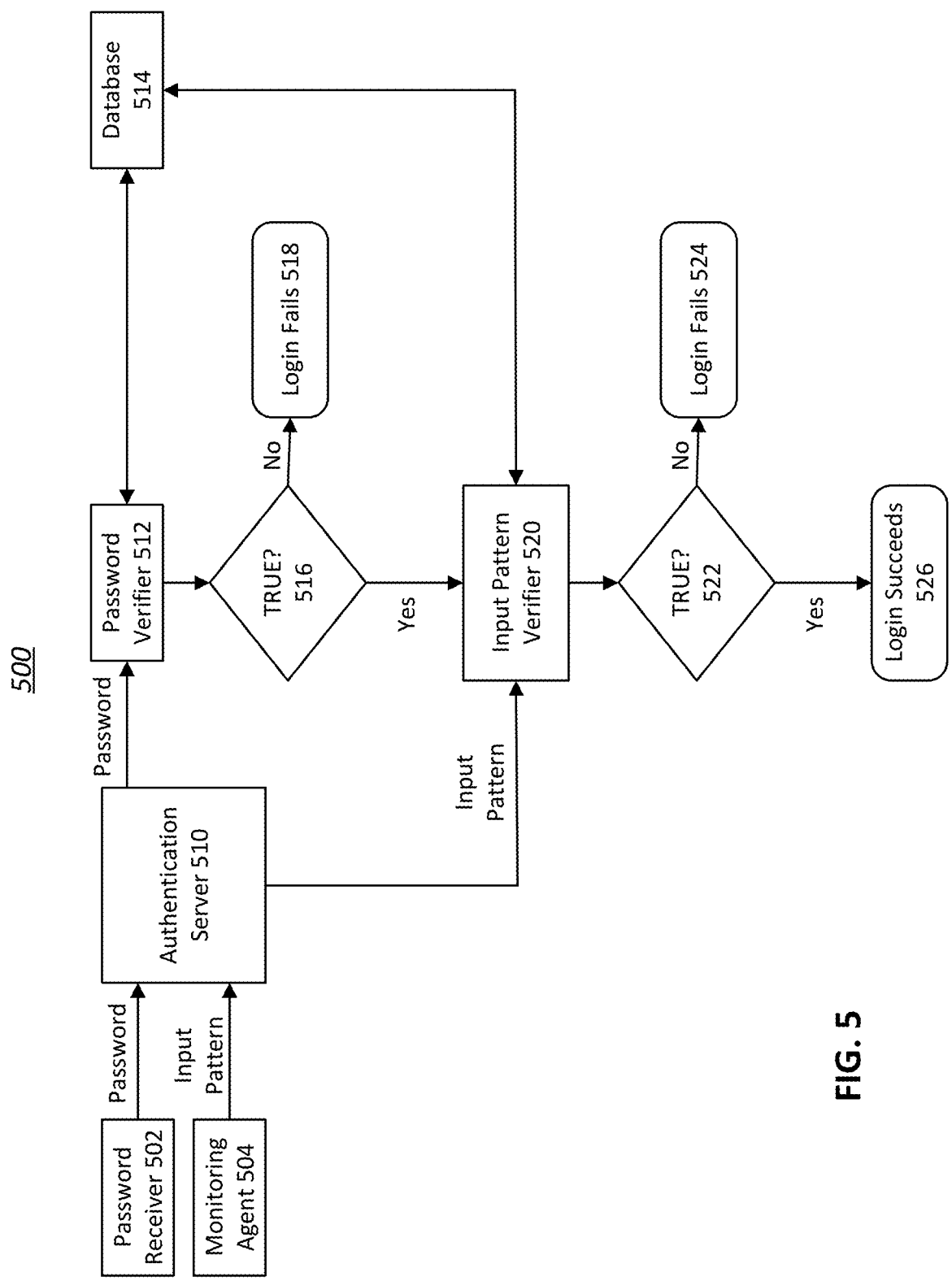
FIG. 5 illustrates an example workflow for authentication passwords, in accordance with various embodiments of the disclosure.

FIG. 5 illustrates an example workflow 500 for authentication passwords, in accordance with various embodiments of the disclosure. The workflow 500 may being with a password receiver 502 providing a password submitted by a user to an authentication server 510 and a monitoring agent 504 providing an input pattern with which the password was inputted by the user to the authentication server 510. The authentication server 510 may provide the password to a password verifier 512 and may provide the input pattern to an input pattern verifier 520. The password verifier 512 may check a database 514 storing a predefined password for the user and compare the password to the predefined password. If the password does not match the predefined password at step 516, the login may fail 518. If the password matches the predefined password at step 516, the input pattern verifier 520 may check the database 514 storing a predefined input pattern for the user and compare the input pattern to the predefined input pattern. If the input pattern does not match the predefined input pattern at step 522, the login may fail 524. If the input pattern matches the predefined input pattern at step 522, the login may succeed 526.

While the workflow 500 is shown with the password verification and the input pattern verification occurring in sequence, this is merely for example and is not limiting. In some embodiments, the input pattern verification may occur before the password verification. In some embodiments, the password verification and the input pattern verification may occur in parallel.

Figure 6:
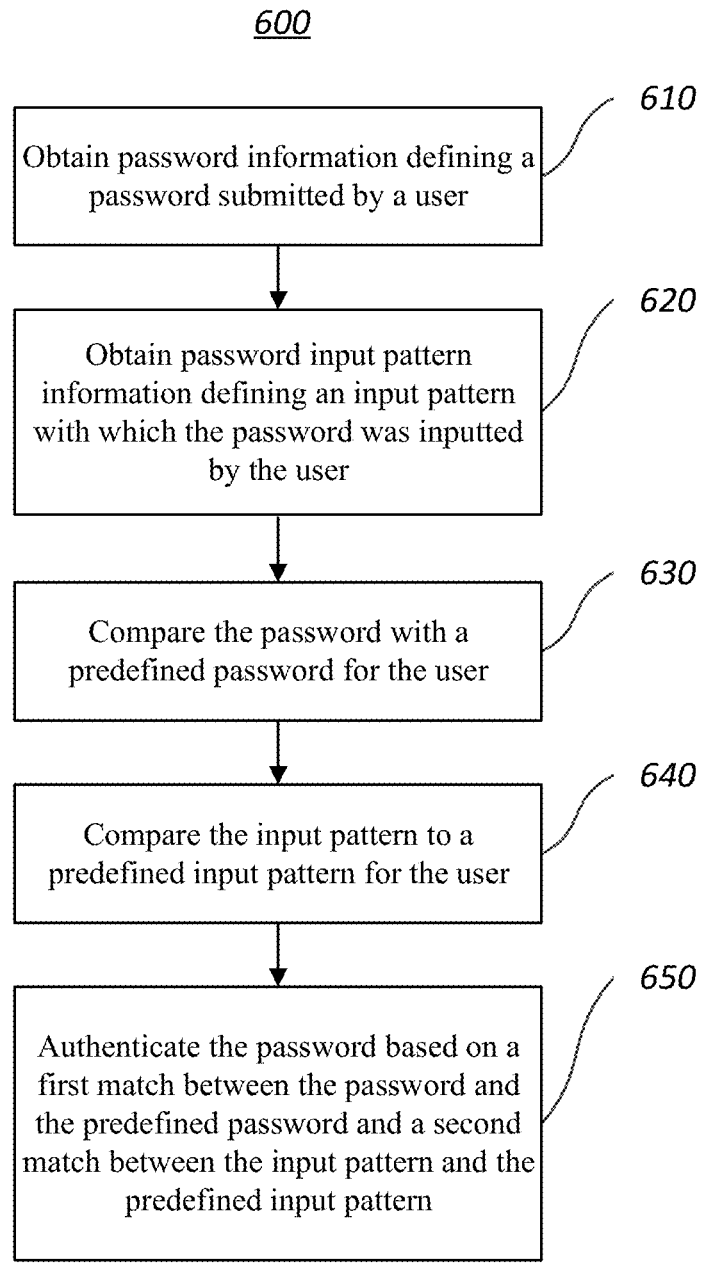
FIG. 6 illustrates a flow chart of an example method, in accordance with various embodiments of the disclosure.

FIG. 6 illustrates a flowchart of an example method 600, according to various embodiments of the present disclosure. The method 600 may be implemented in various environments including, for example, the environment 100 of FIG. 1. The operations of the method 600 presented below are intended to be illustrative. Depending on the implementation, the method 600 may include additional, fewer, or alternative steps performed in various orders or in parallel. The method 600 may be implemented in various computing systems or devices including one or more processors.

With respect to the method 600, at block 610, password information for a user may be obtained. The password information may define a password submitted by the user. At block 620, password input pattern information for the user may be obtained. The password input pattern information may define an input pattern with which the password was inputted by the user. At block 630, the password may be compared with a predefined password for the user. At block 640, the input pattern may be compared with a predefined input pattern for the user. At block 650, the password may be authenticated based on a first match between the password and the predefined password and a second match between the input pattern and the predefined input pattern.

Figure 7:
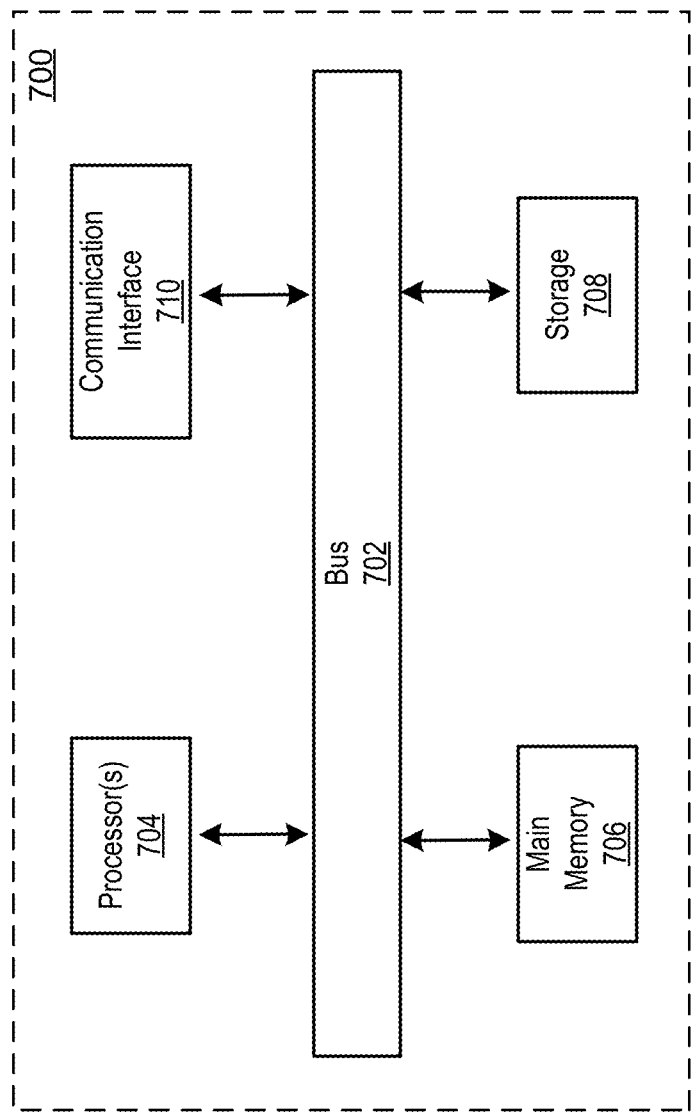
FIG. 7 illustrates a block diagram of an example computer system in which any of the embodiments described herein may be implemented.

FIG. 7 is a block diagram that illustrates a computer system 700 upon which any of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor(s) 704. Main memory 706 also may be used for storing temporary variables or other intermediate information during execution of instructions to be executed by processor(s) 704. Such instructions, when stored in storage media accessible to processor(s) 704, render computer system 700 into a special-purpose machine that is customized to perform the operations specified in the instructions. Main memory 706 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, and networked versions of the same.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 708. Execution of the sequences of instructions contained in main memory 706 causes processor(s) 704 to perform the process steps described herein. For example, the process/method shown in FIG. 6 and described in connection with this figure may be implemented by computer program instructions stored in main memory 706. When these instructions are executed by processor(s) 704, they may perform the steps as shown in FIG. 6 and described above. In alternative embodiments, hard-wired circuitry may be used in place of or in combination with software instructions.

The computer system 700 also includes a communication interface 710 coupled to bus 702. Communication interface 710 provides a two-way data communication coupling to one or more network links that are connected to one or more networks. As another example, communication interface 710 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Certain embodiments are described herein as including logic or a number of components. Components may constitute either software components (e.g., code embodied on a machine-readable medium) or hardware components (e.g., a tangible unit capable of performing certain operations which may be configured or arranged in a certain physical manner). As used herein, for convenience, components of the computing system 102 may be described as performing or configured for performing an operation, when the components may comprise instructions which may program or configure the computing system 102 to perform the operation.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A system for authenticating passwords, the system comprising:
    one or more processors; and
    a memory storing instructions that, when executed by the one or more processors, cause the system to perform:
        obtaining password information for a user, the password information defining a password submitted by the user through a platform;
        obtaining password input pattern information for the user, the password input pattern information defining an input pattern with which the password was inputted by the user, the input pattern including a character pattern and a timing pattern with which one or more characters of the password was inputted by the user;
        comparing the password with a predefined password for the user;
        comparing the input pattern with a predefined input pattern for the user,
            wherein the predefined input pattern is a learned pattern generated for the platform by using machine learning that is trained based on observations of the user's previous input patterns for a predefined number of times or for a predefined duration of time, and
            wherein the user has a corresponding predefined input pattern for each of a plurality of platforms, which is learned on the each of the plurality of platforms; and
        authenticating the password upon a first match between the password and the predefined password and a second match between the input pattern and the corresponding predefined input pattern generated for the platform.

2. The system of claim 1, wherein:
    the character pattern is defined by the user's use of one or more edit inputs to define the password, the one or more edit inputs including one or more of a character addition input, a character deletion input, a shift input, a caps-lock input, a change in entry point input, a copy input, and/or a paste input; and
    the timing pattern is defined by one or more durations of time between input of individual character of the password.

3. A system for authenticating passwords, the system comprising:
    one or more processors; and
    a memory storing instructions that, when executed by the one or more processors, cause the system to perform:
        obtaining password information for a user, the password information defining a password submitted by the user through a platform;
        obtaining password input pattern information for the user, the password input pattern information defining an input pattern with which the password was inputted by the user;
        comparing the password with a predefined password for the user;
        comparing the input pattern with a predefined input pattern for the user,
            wherein the predefined input pattern is a learned pattern generated for the platform by using machine learning that is trained based on observations of the user's previous input patterns for a predefined number of times or for a predefined duration of time, and
            wherein the user has a corresponding predefined input pattern for each of a plurality of platforms, which is learned on the each of the plurality of platforms; and
        authenticating the password upon a first match between the password and the predefined password and a second match between the input pattern and the corresponding predefined input pattern generated for the platform.

4. The system of claim 3, wherein the input pattern includes a character pattern with which one or more characters of the password was inputted by the user.

5. The system of claim 4, wherein the character pattern is defined by the user's use of one or more edit inputs to define the password.

6. The system of claim 5, wherein the one or more edit inputs include one or more of a character addition input, a character deletion input, a shift input, a caps-lock input, a change in entry point input, a copy input, and/or a paste input.

7. The system of claim 6, wherein the user's use of the one or more edit inputs are determined based on the user' interaction with one or more of a keyboard, a mouse, and/or a touchscreen display.

8. The system of claim 3, wherein the input pattern includes a timing pattern with which one or more characters of the password was inputted by the user.

9. The system of claim 8, wherein the timing pattern is defined by one or more durations of time between input of individual character of the password.

10. The system of claim 3, wherein the predefined input pattern for the user is associated with a platform with which the password was inputted by the user.

11. The system of claim 3, wherein the predefined input pattern for the user is not associated with a platform with which the password was inputted by the user.

12. A method for authenticating passwords the method comprising:
obtaining password information for a user, the password information defining a password submitted by the user through a platform;
obtaining password input pattern information for the user, the password input pattern information defining an input pattern with which the password was inputted by the user, the input pattern including a character pattern and a timing pattern with which One or more characters of the password was inputted by the user;
comparing the password with a predefined password for the user;
comparing the input pattern with a predefined input pattern for the user,
wherein the predefined input pattern is a learned pattern generated for the platform by using machine learning that is trained based on observations of the user's previous input patterns for a predefined number of times or for a predefined duration of time, and
wherein the user has a corresponding predefined input pattern for each of a plurality of platforms, which is learned on the each of the plurality of platforms; and
authenticating the password upon a first match between the password and the predefined password and a second match between the input pattern and the corresponding predefined input pattern generated for the platform.

13. The method of claim 12, wherein the input pattern includes a character pattern with which one or more characters of the password was inputted by the user.

14. The method of claim 13, wherein the character pattern is defined by the user's use of one or more edit inputs to define the password.

15. The method of claim 14, wherein the one or more edit inputs include one or more of a character addition input, a character deletion input, a shift input, a caps-lock input, a change in entry point input, a copy input, and/or a paste input.

16. The method of claim 15, wherein the user's use of the one or more edit inputs are determined based on the user's interaction with one or more of a keyboard, a mouse, and/or a touchscreen display.

17. The method of claim 12, wherein the input pattern includes a timing pattern with which one or more characters of the password was inputted by the user.

18. The method of claim 17, wherein the timing pattern is defined by one or more durations of time between input of individual character of the password.

19. The method of claim 12, wherein the predefined input pattern for the user is associated with a platform with which the password was inputted by the user.

20. The method of claim 12, wherein the predefined input pattern for the user is not associated with a platform with which the password was inputted by the user.

\* \* \* \* \*

UNITED STATES PATENT AND TRADEMARK OFFICE
CERTIFICATE OF CORRECTION

PATENT NO. : 11,036,839 B2
APPLICATION NO. : 16/220206
DATED : June 15, 2021
INVENTOR(S) : Xuewen Qin and Liwei Ren Page 1 of 1

It is certified that error appears in the above-identified patent and that said Letters Patent is hereby corrected as shown below:

In the Claims

In Claim 12, Column 13, Line 28, "passwords the" should read --passwords, the--.

In Claim 12, Column 13, Line 37, "which One or more" should read --which one or more--.

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*